(12) United States Patent
Zhang

(10) Patent No.: US 10,859,108 B2
(45) Date of Patent: Dec. 8, 2020

(54) THREADED CONNECTING MEMBER AND THREADED CONNECTING STRUCTURE WITH RADIATING FUNCTION

(71) Applicant: HASCO VISION TECHNOLOGY CO., LTD, Shanghai (CN)

(72) Inventor: Jie Zhang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 284 days.

(21) Appl. No.: 15/972,203

(22) Filed: May 6, 2018

(65) Prior Publication Data

US 2018/0335069 A1    Nov. 22, 2018

(30) Foreign Application Priority Data

May 17, 2017 (CN) ............................ 2017 1 0348943
May 17, 2017 (CN) ...................... 2017 2 0548587 U

(51) Int. Cl.
| | |
|---|---|
| *F16B 35/00* | (2006.01) |
| *F16B 33/00* | (2006.01) |
| *B60Q 1/00* | (2006.01) |
| *F28F 1/20* | (2006.01) |
| *F16B 35/02* | (2006.01) |
| *F21S 45/49* | (2018.01) |

(52) U.S. Cl.
CPC ............ *F16B 33/00* (2013.01); *B60Q 1/0088* (2013.01); *F16B 35/02* (2013.01); *F28F 1/20* (2013.01); *F21S 45/49* (2018.01)

(58) Field of Classification Search
CPC ........... B60Q 1/0088; F16B 35/02; F28F 1/20

USPC .................................................. 411/395, 418
See application file for complete search history.

(56) References Cited

U.S. PATENT DOCUMENTS

| | | | | |
|---|---|---|---|---|
| 418,074 | A | * | 12/1889 | Schue |
| 1,000,280 | A | * | 8/1911 | Messenger ............... F16B 25/00 |
| | | | | 411/418 |
| 3,841,193 | A | * | 10/1974 | Ito ......................... F16B 31/043 |
| | | | | 411/395 |
| 4,712,957 | A | * | 12/1987 | Edwards ................. F16B 35/04 |
| | | | | 411/258 |
| 4,820,097 | A | * | 4/1989 | Maeda ...................... F02K 1/80 |
| | | | | 165/134.1 |
| 5,196,673 | A | * | 3/1993 | Tanis .................... B23P 19/068 |
| | | | | 123/142.5 E |

(Continued)

*Primary Examiner* — Gary W Estremsky
(74) *Attorney, Agent, or Firm* — Global IP Services; Tianhua Gu

(57) ABSTRACT

The present invention provides a threaded connecting member and a threaded connecting structure with a radiating function. Since a radiating passage which extends along a length direction of the threaded connecting member is provided on the threaded connecting member and the radiating passage runs through one end of the threaded connecting member to the other end of the threaded connecting member, when the threaded connecting member with the radiating function provided by the present invention is used, the threaded connecting member is provided in a connecting hole in a connector in a penetrating manner, the radiating passage communicates spaces on two sides of the connector, gas in the spaces on the two sides of the connector can perform heat exchange through the radiating passage and thereby the heat diffusion capability of a connected device is improved.

8 Claims, 6 Drawing Sheets

(56) References Cited

U.S. PATENT DOCUMENTS

| | | | | |
|---|---|---|---|---|
| 5,511,941 A * | 4/1996 | Brandon | ............... | F01D 25/243 |
| | | | | 411/395 |
| 5,855,460 A * | 1/1999 | Brehmer | ............... | B60T 17/086 |
| | | | | 411/14 |
| 6,679,661 B2 * | 1/2004 | Huang | ................. | F16B 13/002 |
| | | | | 411/178 |
| 6,941,758 B2 * | 9/2005 | Tiemann | ................ | F16B 33/00 |
| | | | | 411/395 |
| 7,037,065 B2 * | 5/2006 | Reigl | .................... | F01D 25/243 |
| | | | | 415/47 |
| 2011/0206479 A1 * | 8/2011 | Sexton | ............. | H01J 37/32807 |
| | | | | 411/395 |
| 2012/0124810 A1 * | 5/2012 | Snyder | ................. | B01D 15/22 |
| | | | | 29/428 |

* cited by examiner

View F

… … …

THREADED CONNECTING MEMBER AND THREADED CONNECTING STRUCTURE WITH RADIATING FUNCTION

BACKGROUND OF THE PRESENT INVENTION

Field of the Invention

The present invention relates to a threaded connecting member and a threaded connecting structure with a radiating function, in particular to a threaded connecting member and a threaded connecting structure for connecting an LED substrate and a radiator in an automobile lamp.

Description of Related Arts

In some apparatuses or devices, the radiating function usually has an important influence on the performance and service life of the apparatuses or devices. For example, in an automobile lamp, local radiating capabilities of some heating components usually need to be improved. Especially since more and more devices such as LED luminous chips, DMD or LOCS control chips and laser light sources which emit more heat are used in automobile lamps, generally temperature need to be controlled through additional radiating systems such as added metal radiators, so as to improve local radiating capabilities of related structures in automobile lamps. FIG. 1 and FIG. 2 illustrate an optical system based on an LED luminous chip 3 commonly used in an automobile lamp at present, and the optical system comprises an LED luminous chip 3, a reflector (not shown), a radiator 2 and a screw 4 for fixing the LED luminous chip 3 with the radiator 2. The LED luminous chip 3 is fixed with a substrate 1 through tin solder, and the substrate 1 is generally made of a metallic material with higher heat conductivity, such as aluminum alloy or copper alloy. The LED luminous chip 3 produces a great amount of heat while emitting light, the heat firstly is transferred to the substrate 1 and then is convectively dissipated into surrounding air through the radiator 2 in close contact with the substrate 1. The substrate 1 is provided with a first through hole 13a, the radiator 2 is provided with a second through hole 13b and the substrate 1 is fixed on the radiator 2 through the screw 4. In this connecting mode, air in spaces on two sides of the substrate 1 cannot circulate, and the heat produced by the LED luminous chip 3 is transferred to the radiator 2 only through the heat transfer effect of the substrate 1. Since the transfer speed of this heat transfer mode is slower, the diffusion speed of the heat on the side of the LED luminous chip 3 is slower, the temperature is higher, and both the performance and the service life of the optical system of the automobile lamp are greatly influenced.

SUMMARY OF THE PRESENT INVENTION

In view of the disadvantages of the prior art, the purpose of the present invention is to provide a threaded connecting member and a threaded connecting structure with a radiating function, which can improve the heat diffusion capability of a connected device.

In order to realize the above-mentioned purpose, the present invention provides a threaded connecting member with a radiating function and adopts the following technical solution: a threaded connecting member with the radiating function, the threaded connecting member is rod-shaped, a radiating passage is provided on the threaded connecting member along a length direction of the threaded connecting member, and the radiating passage runs through one end of the threaded connecting member to the other end of the threaded connecting member.

Preferably, the threaded connecting member is a stud and the radiating passage runs through one end of the stud to the other end of the stud.

Preferably, the threaded connecting member is a bolt, the bolt comprises a nut and a threaded rod, and the radiating passage runs through a tail end of the threaded rod to a top surface of the nut.

Preferably, the threaded connecting member is a screw, the screw comprises a nut and a threaded rod and the radiating passage runs through a tail end of the threaded rod to the top surface of the nut.

Preferably, the radiating passage is a radiating hole provided in a central portion of the threaded connecting member and the radiating hole extends along the length direction of the threaded connecting member.

Preferably, the radiating passage is a radiating groove provided in a side surface of the threaded connecting member and the radiating groove extends along the length direction of the threaded connecting member.

Preferably, the radiating passage comprises a radiating hole provided in a central portion of the threaded connecting member and a radiating groove provided in a side surface of the threaded connecting member, and the radiating hole and the radiating groove both extend to the two ends of the threaded connecting member along the length direction of the threaded connecting member.

The present invention further provides a threaded connecting structure with a radiating function and adopts the following technical solution: the threaded connecting structure with the radiating function provided by the present invention comprises the threaded connecting member with the radiating function according to the above-mentioned technical solution or any one of the preferred solutions and a connector, the connector is provided with a connecting hole, the threaded connecting member is provided in the connecting hole in a penetrating manner and the radiating passage communicates spaces on two sides of the connector.

Preferably, the threaded connecting member is a screw, the screw comprises a nut and a threaded rod, a radiating fin is provided between the nut and the connector, the nut presses the radiating fin onto the connector and a radiating nut is mounted at a tail end of the threaded rod.

Preferably, the connector consists of a substrate and a radiator in an LED automobile lamp, an LED luminous chip is provided on the substrate, and the LED luminous chip and the radiator are respectively located on two sides of the substrate; and the connecting hole comprises a first through hole in the substrate and a second through hole in the radiator, the first through hole is aligned with the second through hole and the threaded connecting member penetrates through the first through hole and the second through hole.

Preferably, the radiating passage is connected with a ventilation apparatus.

As described above, the threaded connecting member and the threaded connecting structure with the radiating function provided by the present invention have the following beneficial effects: since the radiating passage is provided on the threaded connecting member along the length direction of the threaded connecting member and the radiating passage runs through one end of the threaded connecting member to the other end of the threaded connecting member, when the threaded connecting member with the radiating function provided by the present invention is used, the threaded connecting member is provided in the connecting hole in the connector in a penetrating manner, the radiating passage communicates the spaces on the two sides of the connector, the gas in the spaces on the two sides of the connector can exchange heat through the radiating passage and thereby the heat diffusion capability of the connected device is improved.

Figure 1:
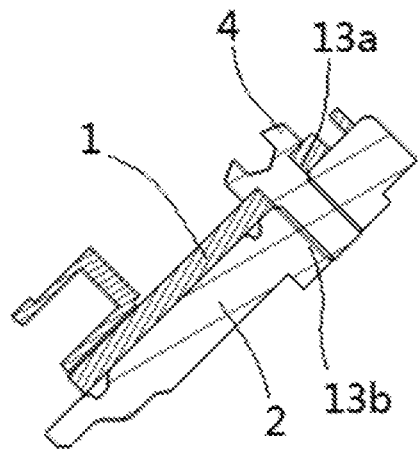
FIG. 1 illustrates a schematic view of a connecting structure for a radiator and a substrate in an LED automobile map in the prior art.

| Description of component mark numbers | |
|---|---|
| 1 | Substrate |
| 2 | Radiator |
| 3 | LED luminous chip |
| 4 | Screw |
| 5 | Stud |
| 6 | Bolt |
| 7 | Nut |
| 8 | Threaded rod |
| 9a | Radiating hole |
| 9b | Ventilating hole |
| 10a | Radiating groove |
| 10b | Ventilating groove |
| 11 | Connector |
| 12 | Connecting hole |
| 13a | First through hole |
| 13b | Second through hole |
| 14 | Radiating fin |
| 15 | Radiating nut |
| 16 | Connecting pipe |
| 17 | Air blower |

DETAILED DESCRIPTION OF THE PREFERRED EMBODIMENTS

The embodiments of the present invention will be described below through specific embodiments. One skilled in the art can easily understand other advantages and effects of the present invention according to contents disclosed by the description.

It shall be noted that the structures, scales, sizes and the like illustrated in the drawings of the description are only used for cooperating with the contents disclosed by the description to allow one skilled in the art to understand and read instead of limiting the implementable limitation conditions of the present invention, and thus have no technical substantive meanings; and any structural modifications, changes of scaling relations or adjustments to sizes shall still fall into the scope which can be covered by the technical contents disclosed by the present invention under the situation that the effects which can be produced by the present invention and the purposes which can be achieved by the present invention are not influenced. In addition, words such as "above", "below", "left", "right", "middle" and "one" cited in the description are just used for facilitating clear description instead of limiting the implementable scope of the present invention. Changes or adjustments of relative relations thereof shall also be deemed as the implementable scope of the present invention under the situation that the technical contents are not substantively changed.

As illustrated in FIGS. 3-8, the present invention provides a threaded connecting member (4, 5, 6) with a radiating function, the threaded connecting member (4, 5, 6) is rod-shaped, the threaded connecting member (4, 5, 6) is provided with a radiating passage (9a, 10a, 9b, 10b) along a length direction of the threaded connecting member (4, 5, 6), and the radiating passage (9a, 10a, 9b, 10b) runs through one end of the threaded connecting member (4, 5, 6) to the other end of the threaded connecting member (4, 5, 6). Since the threaded connecting member (4, 5, 6) is provided with the radiating passage (9a, 10a, 9b, 10b) along the length direction of the threaded connecting member (4, 5, 6) and the radiating passage (9a, 10a, 9b, 10b) runs through one end of the threaded connecting member (4, 5, 6) to the other end of the threaded connecting member (4, 5, 6), when the threaded connecting member (4, 5, 6) with the radiating function provided by the present invention is used, the threaded connecting member (4, 5, 6) is provided in the connecting hole 12 in the connector 11 in a penetrating manner, the radiating passage communicates the spaces on the two sides of the connector 11, the gas in the spaces on the two sides of the connector 11 can perform heat exchange through the radiating passage (9a, 10a, 9b, 10b) and thereby the heat diffusion capability of the connected device is improved.

The threaded connecting member with the radiating function provided by the present invention may be a threaded connecting member with a threaded connecting rod such as a stud 5, a bolt 6 or a screw 4 etc., as long as it has a radiating passage which runs through along the length direction of the threaded connecting member and can allow the gas in the spaces at the two ends of the threaded connecting member to be communicated. The structure of the radiating passage is not limited and may be a hole-shaped structure or a groove-shaped structure which extends along the length direction of the threaded connecting member to allow the gas in the spaces at the two ends of the threaded connecting member to be communicated.

As illustrated in FIGS. 3-7, the threaded connecting member may be a bolt 6, the bolt 6 comprises a nut 7 and a threaded rod 8, and the radiating passage runs through a tail end of the threaded rod 8 to a top surface of the nut 7.

Figure 3:
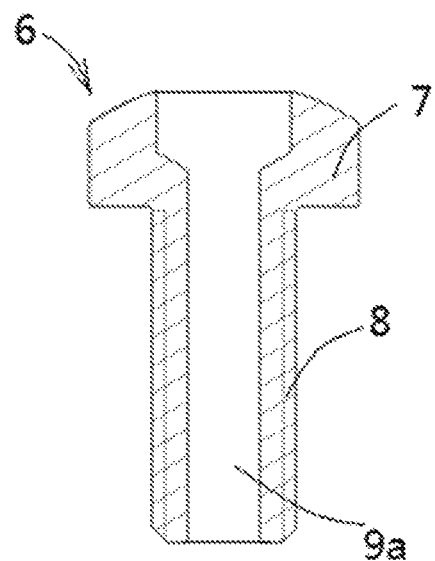
FIG. 3 illustrates a sectional view of a screw with a radiating hole.

When the threaded connecting member is a bolt 6, as embodiment 1, as illustrated in FIG. 3, the radiating passage is a radiating hole 9a provided in a central portion of the bolt 6, the radiating hole 9a extends along the length direction of the bolt 6, and the radiating hole 9a runs through a tail end of the threaded rod 8 to a top surface of the nut 7. Thereby, the bolt 6 illustrated in FIG. 3 can communicate the gas in the spaces at the two ends of the bolt 6, such that the gas in the spaces at the two ends of the bolt 6 can perform heat exchange.

Figure 4:
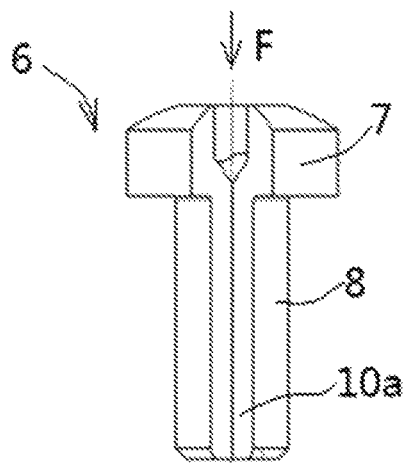
FIG. 4 illustrates a sectional view of a screw with a radiating groove.
Figure 5:
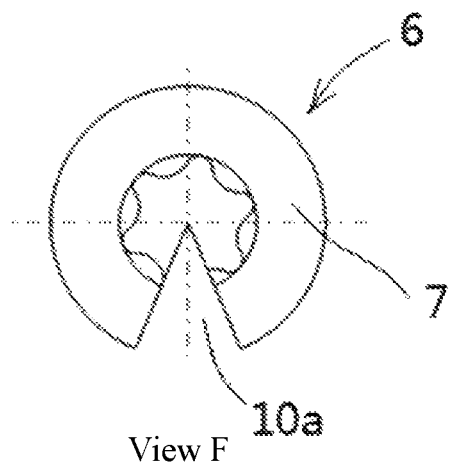
FIG. 5 illustrates a schematic view of the screw in FIG. 4 observed from direction F.

When the threaded connecting member is a bolt 6, as embodiment 2, as illustrated in FIGS. 4-5, the radiating passage is a radiating groove 10*a* provided in a side surface of the bolt 6, the radiating groove 10*a* extends along the length direction of the threaded connecting member, and the radiating groove 10*a* runs through a tail end of the threaded rod 8 to a top surface of the nut 7. Thereby, the bolt 6 illustrated in FIGS. 4-5 can communicate the gas in the spaces at the two ends of the bolt 6, such that the air in the spaces at the two ends of the bolt 6 can perform heat exchange.

Figure 6:
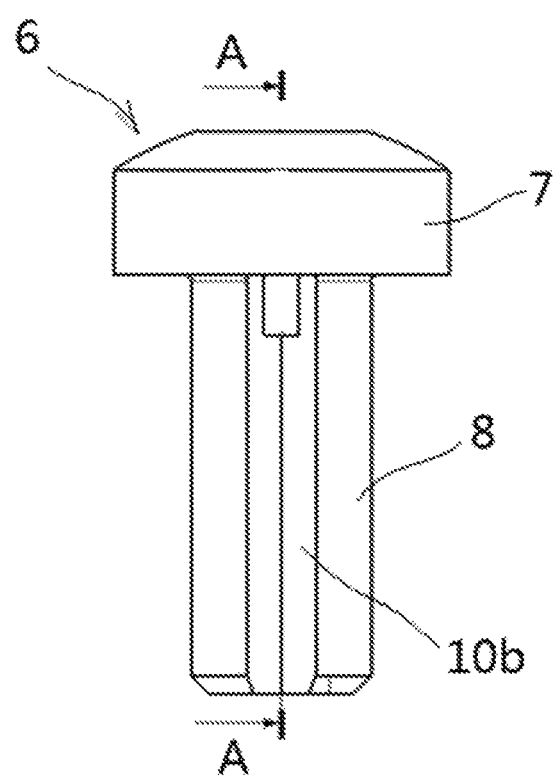
FIG. 6 illustrates a structural schematic view of a bolt comprising a nut with a ventilating hole and a threaded rod with a ventilating groove.
Figure 7:
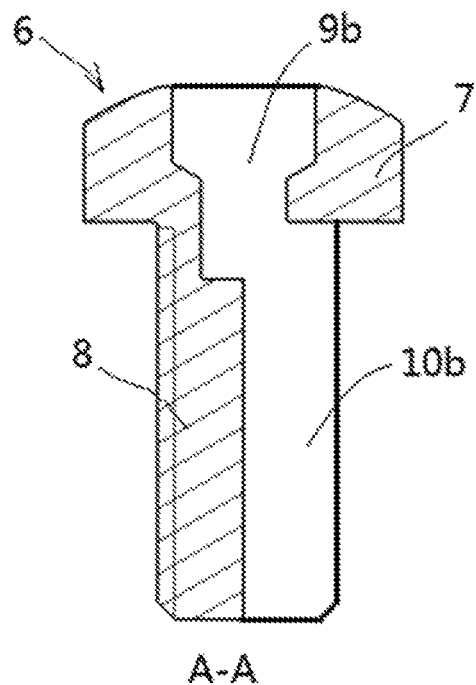
FIG. 7 illustrates an A-A sectional view of the bolt in FIG. 6.

When the threaded connecting member is a bolt 6, as embodiment 3, as illustrated in FIGS. 6-7, the radiating passage comprises a ventilating hole 9*b* provided in a central portion of the nut 7 and a ventilating groove 10*b* provided in a side surface of the threaded rod 8, the ventilating groove 10*b* extends along the length direction of the threaded rod 8, the ventilating hole 9*b* and the ventilating groove 10*b* are communicated at a connecting position between the nut 7 and the threaded rod 8, the ventilating hole 9*b* extends to a top surface of the nut 7 and the ventilating groove 10*b* extends to a tail end of the threaded rod 8. Thereby, the bolt 6 illustrated in FIGS. 6-7 can communicate the gas in the spaces at the two ends of the bolt 6, such that the air in the spaces at the two ends of the bolt 6 can perform heat exchange. Moreover, since the side surface of the nut 7 in FIG. 6 and FIG. 7 does not have a gap, the nut 7 of the bolt 6 can uniformly press the connected part and the connected part is uniformly stressed.

Figure 8:
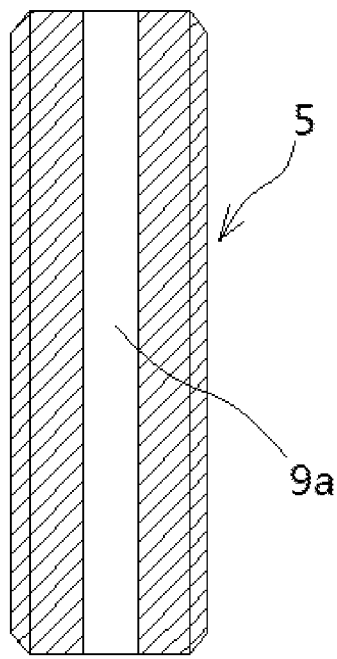
FIG. 8 illustrates a sectional view of a stud with a radiating hole.

As one preferred embodiment, as illustrated in FIG. 8, the threaded connecting member is a stud 5, the radiating passage runs through one end of the stud 5 to the other end of the stud 5, the radiating passage may be a radiating hole 9*a* which is provided in a central portion of the stud 5 and extends along the length direction of the stud 5 as illustrated in FIG. 8, and the two ends of the radiating hole 9*a* respectively extend to the two ends of the stud 5. Of course, the radiating passage may also be a structure similar to the radiating groove 10*a* in FIG. 4 and FIG. 5, or other passage type structures, as long as the radiating passage can allow the gas in the spaces at the two ends of the stud 5 to be communicated.

Preferably, the threaded connecting member with the radiating function provided by the present invention may also be a screw 4, similar to the structure of the bolt 6, the screw 4 also comprises a nut 7 and a threaded rod 8, the radiating passage runs from a tail end of the threaded rod 8 to a top surface of the nut 7, and thus the radiating passage like the radiating hole 9*a* the radiating passage like the radiating groove 10*a* and the radiating passage consisting of the ventilating hole 9*b* and the ventilating groove 10*b* as illustrated in FIGS. 4-7 may all be applied to the structure of the screw 4. When the threaded connecting member is a screw 4, the connected part may be provided with a through hole for mounting the screw 4, the nut 7 of the screw 4 is exposed from one end of the through hole and is communicated with the air gas in the space at one end of the screw 4, and the air gas in the space at the other end of the screw 4 enters the radiating passage from the tail end of the threaded rod 8 of the screw 4 to allow the gas in the spaces at the two ends of the screw 4 to be communicated.

From the above-mentioned implementation modes, it can be seen that, in the threaded connecting member with the radiating function provided by the present invention, the radiating passage may be the radiating hole 9*a* provided in the central portion of the threaded connecting member, the radiating passage may also be a radiating groove 10*a* provided in the side surface of the threaded connecting member, and the radiating groove 10*a* extends along the length direction of the threaded connecting member and communicates the gas in the space at the two ends of the threaded connecting member, such that the gas in the spaces at the two ends of the threaded connecting member can perform heat exchange. Moreover, the radiating groove 10*a* and the radiating hole 9*a* may be simultaneously adopted in the threaded connecting member with the radiating function provided by the present invention. Under this situation, the radiating passage comprises a radiating hole 9*a* provided in the central portion of the threaded connecting member and a radiating groove 10*a* provided in the side surface of the threaded connecting member, and the radiating hole 9*a* and the radiating groove 10*a* both extend along the length direction of the threaded connecting member to the two ends of the threaded connecting member.

The present invention further provides a threaded connecting structure with a radiating function. Please refer to FIG. 9 and FIG. 10. The threaded connecting structure with the radiating function provided by the present invention comprises the threaded connecting member with the radiating function according to the above-mentioned technical solution or any one of the preferred technical solutions and a connector 11, a connecting hole 12 is provided in the connector 11 is provided with a connecting hole 12, the threaded connecting member is provided in the connecting hole 12 in a penetrating manner and the radiating passage communicates spaces on two sides of the connector 11. Since the radiating passage is provided on the threaded connecting member is provided with the radiating passage along the length direction of the threaded connecting member and the radiating passage runs through one end of the threaded connecting member to the other end of the threaded connecting member, when the threaded connecting member with the radiating function provided by the present invention is used, the threaded connecting member is provided in the connecting hole 12 in the connector 11 in a penetrating manner, the radiating passage communicates the spaces on the two sides of the connector 11, the gas in the spaces on the two sides of the connector 11 can perform heat exchange through the radiating passage and thereby the radiating capability of the connected device is improved.

Figure 9:
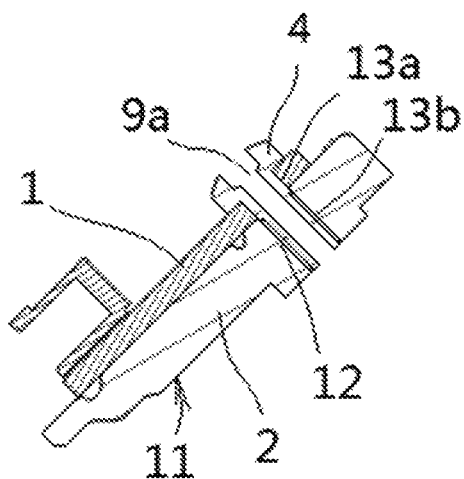
FIG. 9 illustrates a schematic view of embodiment 1 of a substrate and radiator connecting structure.
Figure 10:
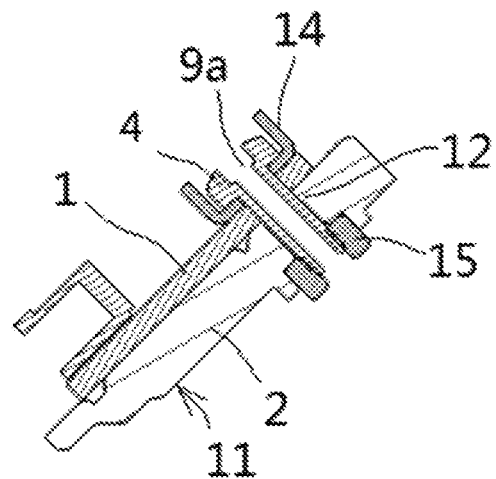
FIG. 10 illustrates a schematic view of embodiment 2 of a substrate and radiator connecting structure.

The threaded connecting structure with the radiating function provided by the present invention is applicable to the situation that there is a radiation demand. When the heat in the space on one side of the connector 11 need be diffused into the space on the other side of the connector 11, the threaded connecting structure with the radiating function provided by the present invention can be adopted. FIG. 9 and FIG. 10 only illustrate the mode that the screw 4 is used as the threaded connecting member. Of course, a stud 5, a bolt 6, or other threaded connecting member with a threaded connecting rod may also be adopted.

Figure 2:
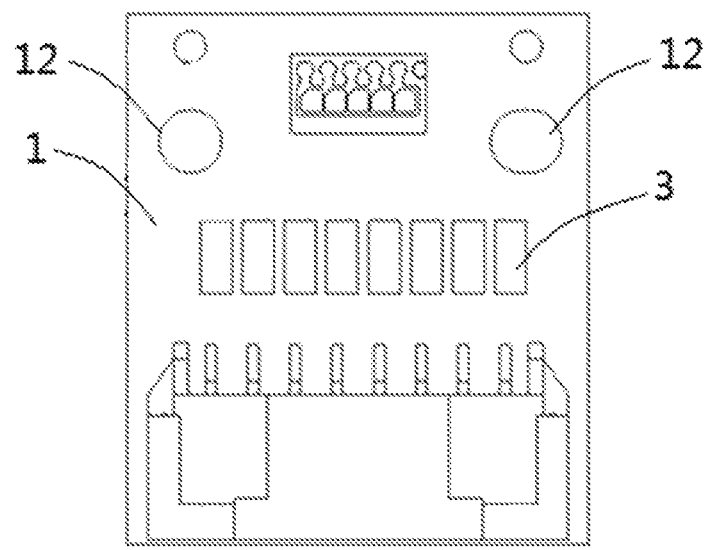
FIG. 2 illustrates a structural schematic view of a substrate an LED luminous chip connected onto the substrate.
Figure 11:
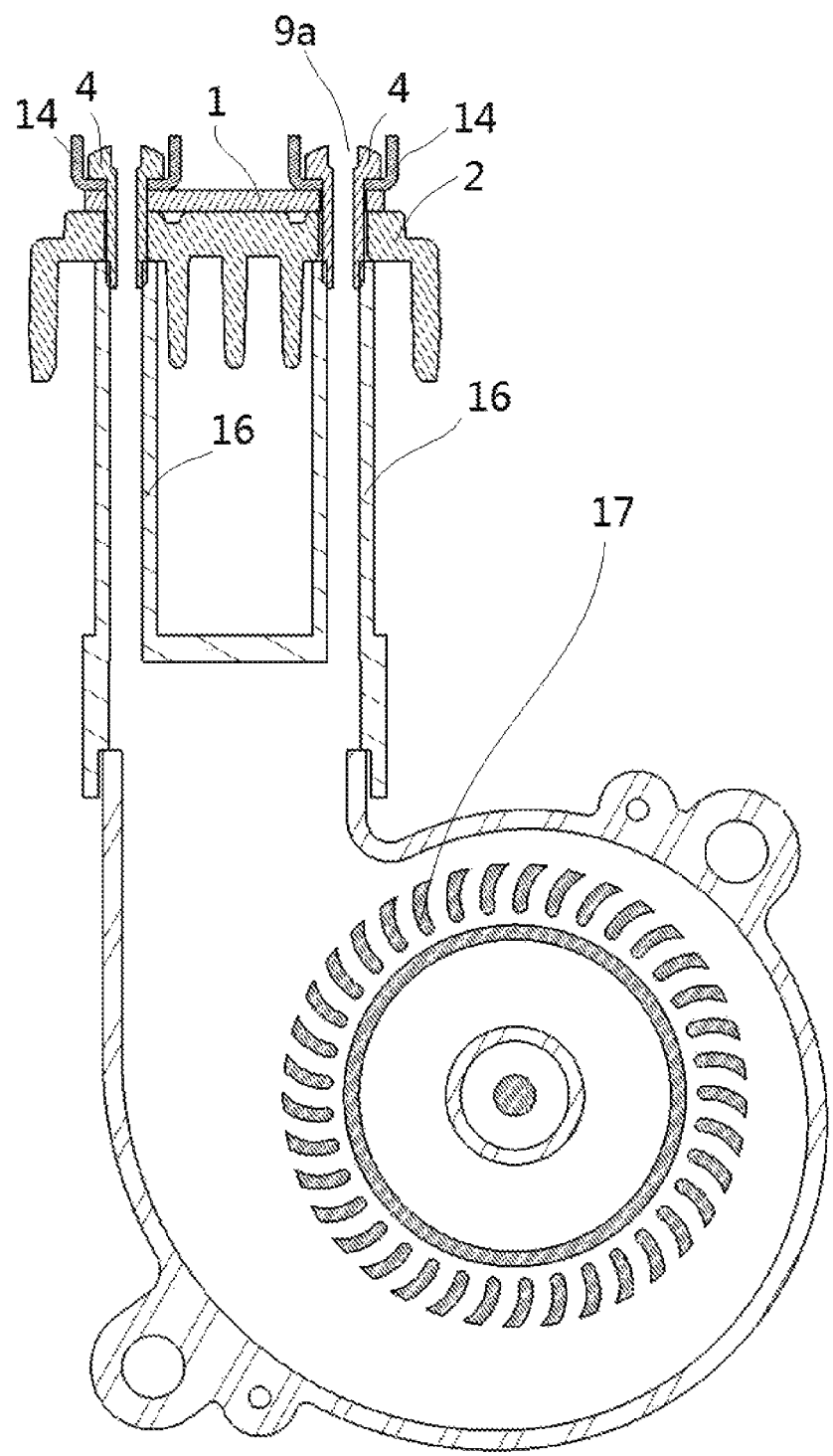
FIG. 11 illustrates a structural schematic view of an air blower connected in a radiating passage of a threaded connecting member.

FIG. 9 and FIG. 10 illustrate an embodiment that the threaded connecting structure with the radiating function provided by the present invention is applied to an LED automobile lamp of an automobile. As illustrated in FIG. 9 and FIG. 10, the connector 11 consists of a substrate 1 and a radiator 2 in an LED automobile lamp, an LED luminous chip 3 (refer to FIG. 2) is provided on the substrate 1, and the LED luminous chip 2 3 and the radiator 2 are respectively located on two sides of the substrate 1; and the connecting hole 12 comprises a first through hole 13a in the substrate 1 and a second through hole 13b in the radiator 2, the first through hole 13a is aligned with to the second through hole 13b and the threaded connecting member penetrates through the first through hole 13a and the second through hole 13b. In FIG. 9 and FIG. 10, the threaded connecting member is a screw 4, the radiating passage is a radiating hole 9a provided in the central portion of the screw 4, and thereby heat produced by the LED luminous chip 3 can be diffused to the radiator 2 through the radiating hole 9a in the central portion of the screw 4, such that the heat on the side of the LED luminous chip can be more quickly diffused, the LED luminous chip is prevented from being damaged or the service life being decreased due to excessively high temperature. In order to enable the threaded connecting structure with the radiating function provided by the present invention to have better radiating performance, as illustrated in FIG. 11, the radiating passage may be communicated with a ventilation apparatus. For example, a connecting pipe 16 may be connected at an end portion of the threaded connecting member and a ventilating apparatus such as an air blower 17 which is capable of promoting air flow may be connected onto the connecting pipe 16. Thereby, the flowing speed of the gas in the radiating passage can be increased and the convective radiating capability can be enhanced.

In the threaded connecting structure with the radiating function provided by the present invention, as one preferred implementation mode embodiment, as illustrated in FIG. 10, the threaded connecting member is a screw 4, the screw 4 comprises a nut 7 and a threaded rod 8, a radiating fin 14 is provided between the nut 7 and the connector 11, the nut 7 presses the radiating fin 14 onto the connector 11, and a radiating nut 15 is mounted at a tail end of the threaded rod 8. The radiating fin 14, the screw 4 and the radiating nut 15 may all be made of a material with good heat conductivity, and the radiating fin 14 can better absorb surrounding heat and transfer the heat to the radiating nut 7 on the other side of the connector 11 through the screw 4. Thereby, the heat exchange of the gas in the spaces on the two sides of the connector 11 can be improved. Of course, even though the radiating passage is not provided on the threaded connecting member, the radiating fin 14 and the radiating nut 15 in FIG. 10 also play a role of improving the heat exchange of the gas in the spaces on the two sides of the connector 11.

To sum up, the present invention effectively overcomes various disadvantages in the prior art and thus has a great industrial utilization value.

The above-mentioned embodiments are just used for exemplarily describing the principle and effects of the present invention instead of limiting the present invention. One skilled in the art may make modifications or changes to the above-mentioned embodiments without going against the spirit and the scope of the present invention. Therefore, all equivalent modifications or changes made by those who have common knowledge in the art without departing from the spirit and technical concept disclosed by the present invention shall be still covered by the claims of the present invention.

What is claimed is:

1. A threaded connecting structure with a radiating functions comprising:
    a threaded connecting member with the radiating function, and a connector (11);
    the threaded connecting member with the radiating function is rod-shaped, a radiating passage is provided on the threaded connecting member along a length direction and runs through one end to other end of the threaded connecting member;
    the connector (11) comprises a substrate (1), a radiator (2) for LED automobile lamp, a LED luminous chip (3) provided on the substrate (1), the LED luminous chip (3) and the radiator (2) are respectively located on two sides of the substrate (1);
    a connecting hole (12) comprising a first through hole (13a) in the substrate (1) and a second through hole (13b) in the radiator (2), the first through hole (13a) is aligned with the second through hole (13b);
    the threaded connecting member penetrates through the first through hole (13a) and the second through hole (13b) to connect the substrate (1) with the radiator (2).

2. The threaded connecting structure with the radiating function according to claim 1, wherein the radiating passage is connected with a ventilation apparatus.

3. The threaded connecting structure with the radiating function according to claim 1, wherein the threaded connecting member is a stud (5) and the radiating passage runs through one end of the stud (5) to the other end of the stud (5).

4. The threaded connecting structure with the radiating function according to claim 1, wherein the threaded connecting member is a bolt (6), the bolt (6) comprises a nut (7) and a threaded rod (8), and the radiating passage runs through a tail end of the threaded rod (8) to a top surface of the nut (7).

5. The threaded connecting structure with the radiating function according to claim 1, wherein the threaded connecting member is a screw (4), the screw (4) comprises a nut (7) and a threaded rod (8), and the radiating passage runs through a tail end of the threaded rod (8) to a top surface of the nut (7).

6. The threaded connecting structure with the radiating function according to claim 1, wherein the radiating passage is a radiating hole (9a) provided in a central portion of the threaded connecting member and the radiating hole (9a) extends along the length direction of the threaded connecting member.

7. The threaded connecting structure with the radiating function according to claim 1, wherein the radiating passage is a radiating groove (10a) provided in a side surface of the threaded connecting member and the radiating groove (10a) extends along the length direction of the threaded connecting member.

8. The threaded connecting structure with the radiating function according to claim 1, wherein the radiating passage comprises a radiating hole (9a) provided in a central portion of the threaded connecting member and a radiating groove (10a) provided in a side surface of the threaded connecting member, and the radiating hole (9a) and the radiating groove (10a) both extend along the length direction of the threaded connecting member to the two ends of the threaded connecting member.

* * * * *